United States Patent
Mandy et al.

(10) Patent No.: US 9,035,494 B2
(45) Date of Patent: May 19, 2015

(54) ELEVATOR INTERIOR ILLUMINATION

(71) Applicant: Man-D-Tec, Inc., Scottsdale, AZ (US)

(72) Inventors: Dalton J. Mandy, Scottsdale, AZ (US); Terry R. Mandy, Paradise Valley, AZ (US); Brandon R. Mandy, Scottsdale, AZ (US)

(73) Assignee: MAN-D-TEC, INC., Scottsdale, AZ (US)

( * ) Notice: Subject to any disclaimer, the term of this patent is extended or adjusted under 35 U.S.C. 154(b) by 258 days.

(21) Appl. No.: 13/788,496

(22) Filed: Mar. 7, 2013

(65) Prior Publication Data

US 2014/0252948 A1 Sep. 11, 2014

(51) Int. Cl.
*H02J 7/00* (2006.01)
*H05B 33/08* (2006.01)
*H02J 9/00* (2006.01)

(52) U.S. Cl.
CPC .............. *H05B 33/0815* (2013.01); *H02J 9/00* (2013.01)

(58) Field of Classification Search
USPC ......... 315/77, 86, 129, 209 R, 224, 225, 226, 315/291; 307/64, 66; 340/693.1, 693.2
See application file for complete search history.

(56) References Cited

U.S. PATENT DOCUMENTS

| | | | |
|---|---|---|---|
| 3,294,977 A | 12/1966 | Duncan | |
| 3,808,499 A | 4/1974 | Edwards | |
| 4,013,993 A | 3/1977 | Mandel et al. | |
| 4,056,757 A | 11/1977 | Mauch et al. | |
| 4,708,223 A | 11/1987 | Orndorff et al. | |
| 4,890,200 A | 12/1989 | Mandy | |
| 5,003,432 A | 3/1991 | Mandy | |
| 5,661,645 A | 8/1997 | Hochstein | |
| 5,739,639 A | 4/1998 | Johnson | |
| 5,966,069 A | 10/1999 | Zmurk et al. | |
| 6,609,804 B2 | 8/2003 | Nolan et al. | |
| 6,860,628 B2 | 3/2005 | Robertson et al. | |
| 7,071,625 B2 | 7/2006 | Cheng et al. | |
| 7,114,830 B2 | 10/2006 | Robertson et al. | |
| 7,486,033 B2 | 2/2009 | Chen et al. | |
| 8,192,039 B1* | 6/2012 | Moe et al. ....................... 362/20 |
| 8,558,407 B2* | 10/2013 | Mandy et al. ................... 307/66 |
| 2008/0024010 A1 | 1/2008 | Romano | |
| 2008/0258628 A1 | 10/2008 | Higley et al. | |
| 2008/0296975 A1 | 12/2008 | Shakespeare et al. | |
| 2011/0298381 A1* | 12/2011 | Sauerlaender ............ 315/185 R |

\* cited by examiner

*Primary Examiner* — Douglas W Owens
*Assistant Examiner* — Thai Pham
(74) *Attorney, Agent, or Firm* — Reising Ethington P.C.

(57) ABSTRACT

An elevator interior illumination assembly comprising a primary LED driver that provides conditioned DC power to primary and backup LEDs when AC power is available from a primary electric power source. The backup LEDs receive DC power from a backup electric power source when AC power is not available to the primary LED driver from the primary electric power source.

14 Claims, 3 Drawing Sheets

ELEVATOR INTERIOR ILLUMINATION

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

1. Field

This application relates generally to an elevator interior illumination assembly comprising LED lamps and capable of operating on either a primary elevator electrical power source or, in the event of a loss of same, a backup power source.

2. Description of Related Art Including Information Disclosed Under 37 CFR 1.97 and 1.98

By law, elevators must be fitted with illumination assemblies capable of providing emergency backup interior illumination upon loss of power from a primary electrical power source, e.g., upon loss of AC power from a municipal electrical power supply grid. Elevator code requirements currently specify that at least two lamps must run continuously for a minimum of 4 hours in an emergency backup lighting mode, and longer run times are obviously preferable. Some elevator codes may also require that two independent "strings" of lamps operate during an emergency. It can be a challenge to design an elevator interior illumination assembly to be efficient enough to provide 4 hours of lighting where two LED lamps must be operated on two independent circuits from an onboard battery backup power source—especially where, as is the current practice, the two LED lamp circuits are provided conditioned DC power by an LED driver that receives AC power from an inverter that receives DC power from one or more batteries.

SUMMARY

An elevator interior illumination assembly is provided, which includes a primary LED mountable in a position to direct light into a compartment, and a primary LED driver electrically couplable between a primary electric power source and the primary LED. The primary LED driver may be configured to receive AC power from the primary electric power source and to provide conditioned DC power to the primary LED. A first backup LED may be mountable in a position to direct light into the compartment and may be configured to operate on DC power received from either the primary LED driver or a backup electric power source. The assembly may also include a switching unit configured to couple the first backup LED to the primary LED driver when AC power is available from the primary electric power source, and to couple the first backup LED to the backup electrical power source when AC power is not available to the primary LED driver from the primary electric power source.

DRAWINGS DESCRIPTIONS

These and other features and advantages will become apparent to those skilled in the art in connection with the following detailed description and drawings of one or more embodiments of the invention, in which.

DETAILED DESCRIPTION

Figure 1:
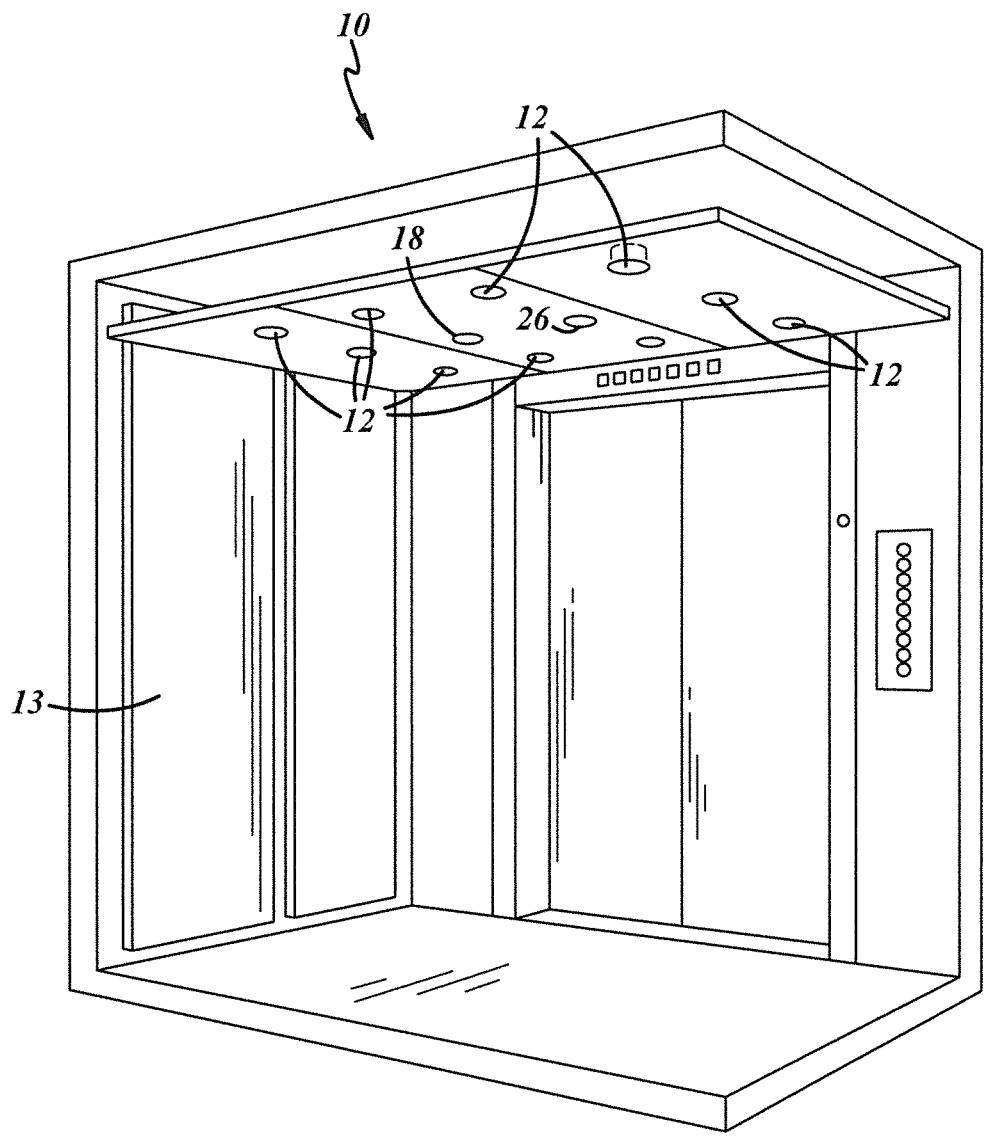
FIG. 1 is a partially cut-away perspective view of an elevator comprising an illumination assembly installed in a ceiling of the elevator.
Figure 2:
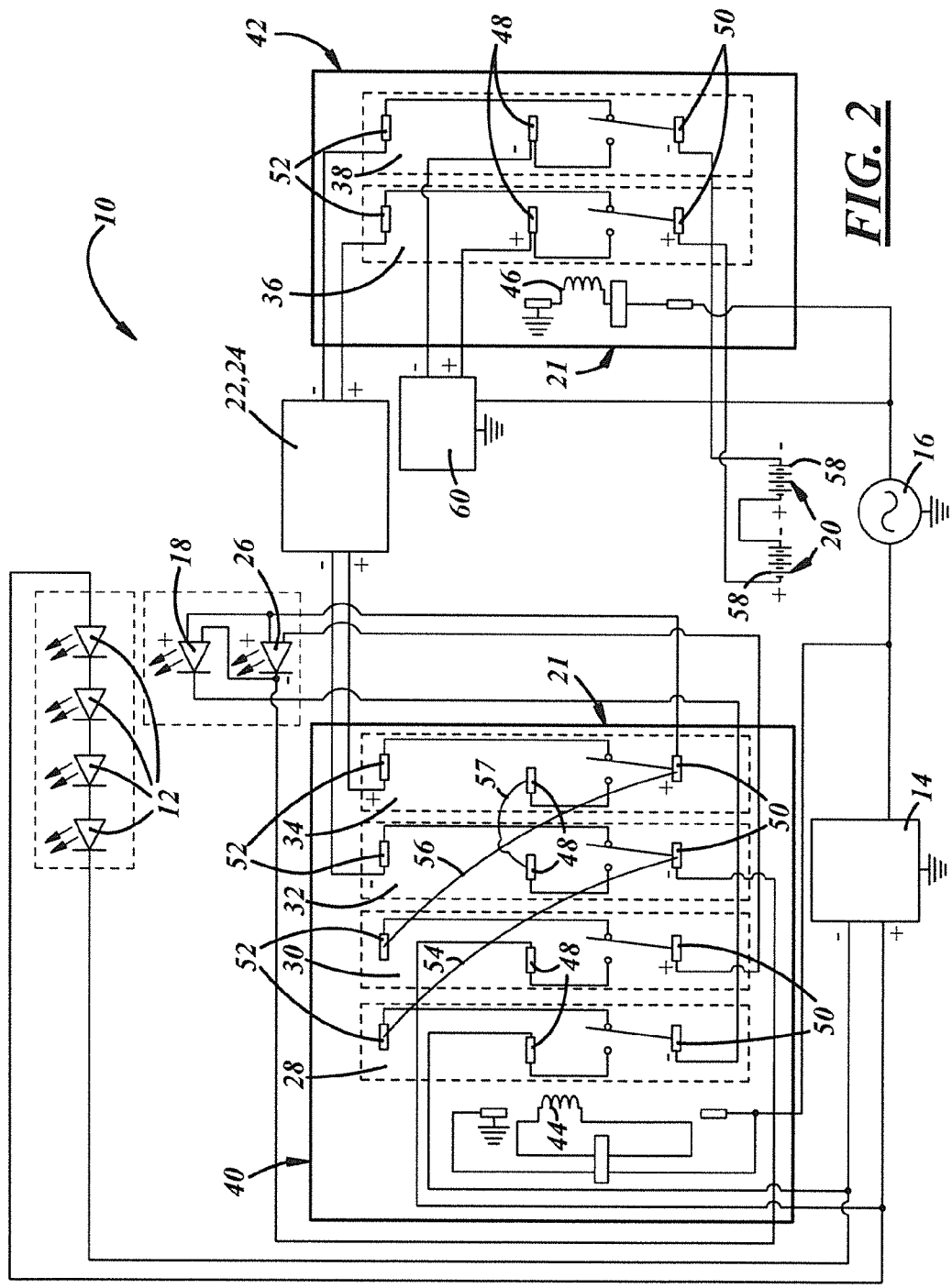
FIG. 2 is a schematic diagram showing a first embodiment of the elevator interior illumination assembly of FIG. 1.

Generally shown at 10 in FIGS. 1 and 2 is a first embodiment of an assembly for illuminating an elevator interior, using either a primary elevator electrical power source or, in the event of a loss of same, a backup power source. A second embodiment is generally shown at 10' in FIG. 3. Reference numerals with the designation prime (') in FIG. 3 indicate alternative configurations of elements that also appear in the first embodiment. Unless indicated otherwise, where a portion of the following description uses a reference numeral to refer to FIGS. 1 and 2, that portion of the description applies equally to elements designated by primed numerals in FIG. 3.

As shown in FIG. 1, the assembly 10 may include one or more primary LEDs 12 mountable in respective positions from which they are able to direct light into a compartment 13. As shown in FIG. 2, the assembly 10 may also include a primary LED driver 14 electrically couplable between a primary electric power source 16 and the primary LEDs 12. The primary LED driver 14 may be configured to receive AC power from the primary electric power source 16 and to provide conditioned DC power to the primary LEDs 12.

As is also shown in FIG. 1, the assembly 10 may include a first backup LED 18 mountable in a position from which it is able to direct light into the compartment 13. As shown in FIG. 2, the first backup LED 18 may be configured to operate on DC power received from either the primary LED driver 14 or a backup electric power source 20.

As shown in FIG. 2, the assembly 10 may also include a switching unit 21 configured to couple the first backup LED 18 to the primary LED driver 14 when AC power is available from the primary electric power source 16. The switching unit 21 may also be configured to couple the first backup LED 18 to the backup electrical power source 20 when AC power is not available to the primary LED driver 14 from the primary electric power source 16.

As is also shown in FIG. 2, the assembly 10 may include a backup LED driver 22 electrically couplable between the backup electric power source 20 and the first backup LED 18. The backup LED driver 22 may be configured to provide conditioned DC power to the backup LED 18. The backup LED driver 22 may comprise a DC/DC converter 24, which may be configured to hold current constant at an acceptable operating level for the backup LED 18 while stepping backup DC power voltage to an acceptable operating voltage for the backup LED 18.

The first backup LED 18 may be alternately couplable to the primary LED driver 14 and the backup LED driver 22. The switching unit 21 may thus be configured to couple the first backup LED 18 to the primary LED driver 14 and to decouple the backup LED driver 22 from the first backup LED 18 and from the backup electrical power source 20 when AC power is available from the primary electric power source 16. The switching unit 21 may be configured to couple the first backup LED 18 to the backup LED driver 22 and the backup LED driver 22 to the backup electrical power source 20 and to de-couple the first backup LED 18 from the primary LED driver 14 when AC power is not available from the primary electric power source 16.

As shown in FIGS. 1 and 2, the assembly 10 may include a second backup LED 26 that, as shown in FIG. 2, may be alternately couplable to the primary and backup LED drivers 14, 22. The switching unit 21 may be configured to electrically couple the second backup LED 26 to the primary LED driver 14 in series with the first backup LED 18 when AC power is available to the primary LED driver 14 from the primary electric power source 16. The switching unit 21 may also be configured to electrically couple the second backup LED 26 with the backup LED driver 22 in parallel with the first backup LED 18 when AC power is not available to the primary LED driver from the primary electric power source. Alternate embodiments may include any number of primary LEDs and any number of backup LEDs connectable and operable as described above.

The switching unit 21 may include first 28, second 30, third 32, fourth 34, fifth 36, and sixth 38 DPDT relay armature switch sets. The first through fourth DPDT armature switch sets 28-34 may be carried by a first DPDT relay 40, and the fifth and sixth switch sets 36, 38, may be carried by a second DPDT relay 42. The primary power source 16 may be coupled to respective first and second coils 44, 46 of the first and second DPDT relays 40, 42. When AC power is available, the primary power source 16 may provide AC power to the primary LED driver 14 and energize first and second relay coils 44, 46 of the first and second DPDT relays 40, 42, respectively.

The primary LED driver 14 may provide voltage across respective normally closed (NC) pins 48 of the first and second DPDT relay armature switch sets 28, 30. The second backup LED 26 may be connected between a common (COM) pin 50 of the second DPDT relay armature switch set 30 and a COM pin 50 of the third DPDT relay armature switch set 32. The first backup LED 18 may be connected between a COM pin 50 of the first DPDT relay armature switch set 28 and a COM pin 50 of the fourth DPDT armature switch set 34. The backup LED driver 22 may be coupled to respective normally open (NO) pins 52 of third and fourth DPDT relay armature switch sets 32, 34. First 54 and second 56 jumpers may couple the NO pins 52 of the first and second switch sets 28, 30 with the COM pins 50 of the third and fourth switch sets 32, 34, respectively. A third jumper 57 may couple NC pins 48 of the third and fourth DPDT relay armature switch sets 32, 34. The backup power source 20 may be coupled to and provide DC voltage across COM pins 50 of the fifth and sixth DPDT relay armature switch sets 36, 38.

When AC power is available the primary power source 16 provides AC power to the primary LED driver 14 and energizes the relay coils 44, 46 adjacent the respective first and second DPDT relay armature switch sets 28, 30. This connects the first and second backup LEDs 18, 26 in series with the primary LED driver 14 and allows the primary LED driver 14 to power the two backup LEDs 18, 26 as a single string.

When AC power is not available the backup LED driver 22 may be coupled with respective NO pins 52 of the fifth and sixth DPDT relay armature switch sets 36, 38. In this case, the relay coils 44, 46 are not energized, and the first and second backup LEDs 18, 26 are connected in respective parallel circuits to the backup LED driver 22 such that the backup electric power source 20 powers the first and second backup LEDs 18, 26 through the backup LED driver 22. This allows the backup LED driver 22 to power the two backup LEDs 18, 26 on two separate strings.

The backup electric power source 20 may also or alternatively include one or more batteries 58. A battery charger 60 may be coupled to and provide DC voltage across NC pins 48 of the fifth and sixth DPDT relay armature switch sets 36, 38. The battery charger 60 may be coupled to and may receive AC power from the primary power source 16 such that, when AC power is available and the relay coils 44, 46 are energized, a circuit is closed that includes the battery charger 60 and one or more batteries 58, allowing the battery charger 60 to provide DC charging voltage across terminals of the one or more batteries 58 of the backup power source 20.

Figure 3:
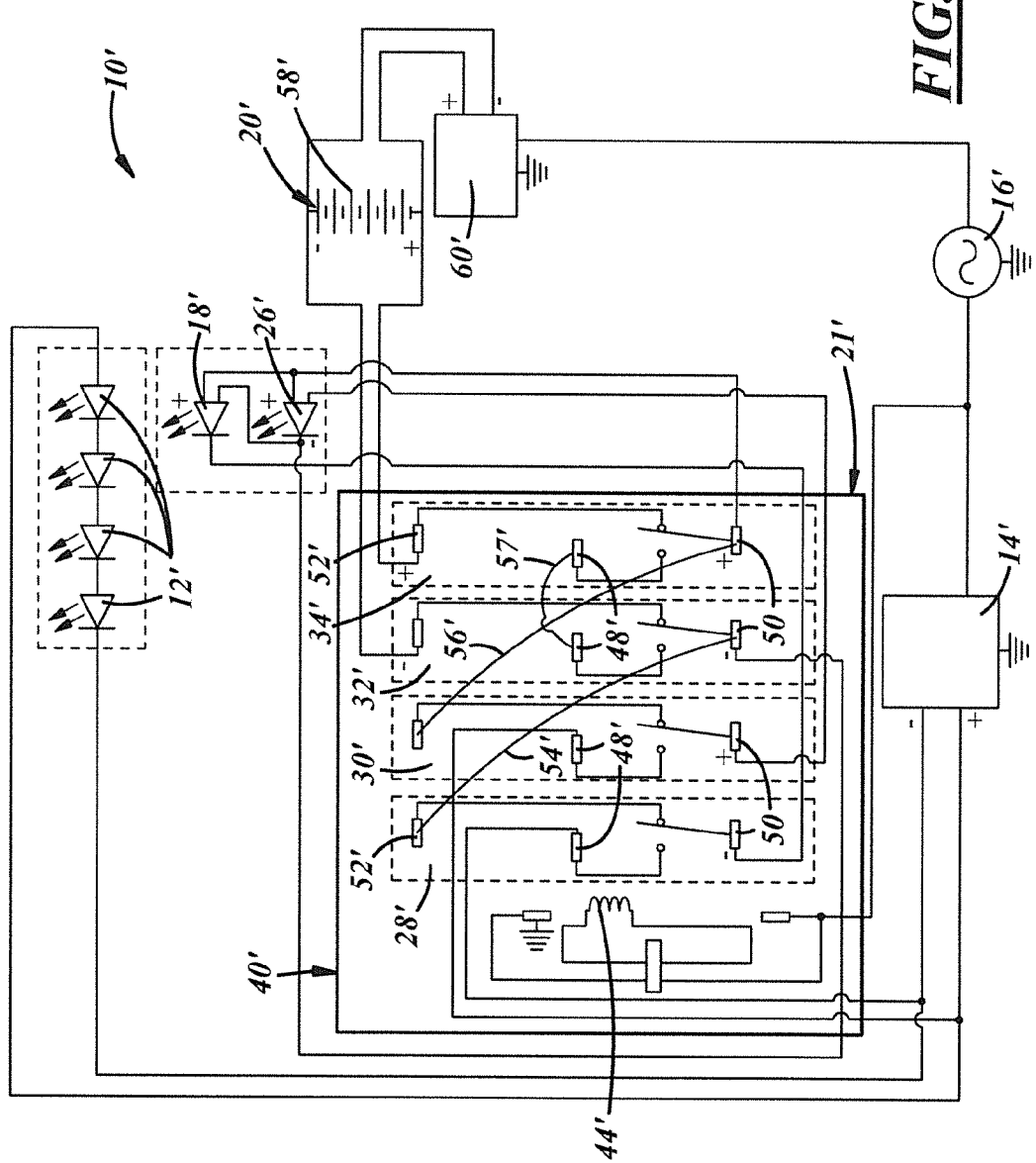
FIG. 3 is a schematic diagram showing a second embodiment of the elevator interior illumination assembly of FIG. 1.

According to the second embodiment, and as shown in FIG. 3, a switching unit 21' may be configured to electrically couple a first backup LED 18' with a primary LED driver 14' in series with a second backup LED 26', when AC power is available to the primary LED driver 14' from a primary electric power source 16'. When AC power is not available to the primary LED driver 14' from the primary electric power source 16', the switching unit 21' electrically couples the first backup LED 18' with a backup electric power source 20' in parallel with the second backup LED 26'.

The switching unit 21' may include a DPDT relay 40' that may carry first 28', second 30', third 32', and fourth 34' DPDT relay armature switch sets. The primary LED driver 14' provides voltage across respective normally closed (NC) pins 48' of the first and second DPDT relay armature switch sets 28', 30' when AC power is available. The second backup LED 26' may be connected between a common (COM) pin 50' of the second DPDT relay armature switch set 30' and a COM pin 50' of the third DPDT relay armature switch set 32'. The first backup LED 18' may be connected between a common (COM) pin 50' of the first DPDT relay armature switch set 28' and a COM pin 50' of the fourth DPDT armature switch set 34'. The backup electric power source 20' may be coupled to and provide DC voltage across respective NO pins 52' of third and fourth DPDT relay armature switch sets 32', 34' when AC power is not available. First 54' and second 56' jumpers may couple the NO pins 52' of the first and second switch sets 28', 30' to the respective COM pins 50' of the third and fourth switch sets 32', 34'. A third jumper 57' may couple NC pins 48' of the third and fourth DPDT relay armature switch sets 32', 34'.

When AC power is available the primary power source 16' provides power to the primary LED driver 14' and energizes a relay coil 44' adjacent the first and second DPDT relay armature switch sets. This connects the first and second backup LEDs 18', 26' in series with the primary LED driver 14' and allows the primary LED driver 14' to power the two backup LEDs 18', 26' as a single string. The primary LED driver 14' may be configured to adjust output voltage to meet the needs of the LEDs it's powering. This arrangement may be configured to provide, for example, a constant 700 mA current and an approximate variable 21 VDC to the two backup LEDs 18', 26' when they are wired in series and AC power is available. When AC power is not available and the relay coil 44' is not energized, the first and second backup LEDs 18', 26' are connected in respective parallel circuits to the backup electric power source 20', allowing the backup electric power source 20' to power the two backup LEDs 18', 26' on two separate strings.

According to the second embodiment, the backup electric power source 20' may comprise one or more batteries 58', which, upon loss of AC power, may provide 6VDC, for example, and variable current to the parallel-wired backup LEDs 18', 26'. A battery charger 60' may be coupled between the primary electric power source 16' and the battery 58', and may be configured to receive AC power from the primary electric power source 16' and provide DC charging voltage across terminals of the battery 58' when AC power is available from the primary power source 16'.

An elevator interior illumination assembly constructed as described above will maintain illumination of backup LEDs upon the loss of AC power from a primary power source, and will do so by automatically switching to DC power provided by a backup power source. Since the assembly is configured to circumvent the LED driver when providing DC power from the backup power source to the backup LEDs, no inverter is needed to convert the backup DC power to AC power suitable for the LED driver. This eliminates losses that would otherwise be incurred while operating the backup LEDs on backup DC power and lengthens the time that the backup power source is able to illuminate the backup LEDs.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An elevator interior illumination assembly comprising:
    a primary LED mountable in a position to direct light into a compartment;
    a primary LED driver electrically couplable between a primary electric power source and the primary LED and configured to receive AC power from the primary electric power source and provide conditioned DC power to the primary LED;
    a first backup LED mountable in a position to direct light into the compartment and configured to operate on DC power received from either the primary LED driver or a backup electric power source; and
    a switching unit configured to:
        couple the first backup LED to the primary LED driver when AC power is available from the primary electric power source; and
        couple the first backup LED to the backup electrical power source when AC power is not available to the primary LED driver from the primary electric power source.

2. An elevator interior illumination assembly as defined in claim 1 in which:
    the assembly includes a backup LED driver electrically couplable between a backup electric power source and the first backup LED and configured to provide conditioned DC power to the backup LED;
    the first backup LED is alternately couplable to the primary LED driver and the backup LED driver; and
    the switching unit is configured to:
        de-couple the backup LED driver from the first backup LED and from the backup electrical power source when AC power is available from the primary electric power source; and
        couple the first backup LED to the backup LED driver and the backup LED driver to the backup electrical power source when AC power is not available from the primary electric power source.

3. An elevator interior illumination assembly as defined in claim 2 in which the backup LED driver comprises a DC/DC converter configured to step backup DC power voltage to an acceptable operating voltage for the backup LED.

4. An elevator interior illumination assembly as defined in claim 3 in which the DC/DC converter is configured to hold current constant at an acceptable operating level for the backup LED while stepping backup DC power voltage to an acceptable operating voltage for the backup LED.

5. An elevator interior illumination assembly as defined in claim 1 in which the assembly includes a second backup LED alternately couplable to the primary and backup LED drivers.

6. An elevator interior illumination assembly as defined in claim 5 in which the switching unit is configured to:
    electrically couple the second backup LED with the primary LED driver in series with the first backup LED when AC power is available to the primary LED driver from the primary electric power source; and
    electrically couple the second backup LED with the backup LED driver in parallel with the first backup LED when AC power is not available to the primary LED driver from the primary electric power source.

7. An elevator interior illumination assembly as defined in claim 6 in which:
    the switching unit includes first, second, third, fourth, fifth, and sixth DPDT relay armature switch sets;
    the primary LED driver provides voltage across respective normally closed (NC) pins of the first and second DPDT relay armature switch sets;
    the second backup LED is connected between a common (COM) pin of the second DPDT relay armature switch set and a COM pin of the third DPDT relay armature switch set;
    the first backup LED is connected between a common (COM) pin of the first DPDT relay armature switch set and a COM pin of the fourth DPDT armature switch set;
    the backup LED driver is coupled to respective NO pins of third and fourth DPDT relay armature switch sets;
    first and second jumpers couple the NO pins of the first and second switch sets with the COM pins of the third and fourth switch sets, respectively;
    a third jumper couples NC pins of the third and fourth DPDT relay armature switch sets;
    the backup power source is coupled to and provides DC voltage across COM pins of the fifth and sixth DPDT relay armature switch sets; and
    when AC power is available the primary power source provides AC power to the primary LED driver and energizes a relay coil adjacent the first and second DPDT relay armature switch sets, which connects the first and second backup LEDs in series with the primary LED driver;
    when AC power is not available the backup LED driver is coupled with respective NO pins of the fifth and sixth DPDT relay armature switch sets, the relay coil is not energized, and the first and second backup LEDs are connected in respective parallel circuits to the backup LED driver such that the backup electric power source powers the first and second backup LEDs through the backup LED driver.

8. An elevator interior illumination assembly as defined in claim 7 in which:
    the backup electric power source includes a battery; and
    the assembly includes a battery charger coupled to and providing DC voltage across NC pins of the fifth and sixth DPDT relay armature switch sets, the battery charger being coupled to and receiving AC power from the primary power source such that, when AC power is available and the relay coil is energized, a circuit is closed that includes the battery charger and battery, allowing the battery charger to provide DC charging voltage across terminals of the battery.

9. An elevator interior illumination assembly as defined in claim 7 in which:
    the switching unit includes a first DPDT relay carrying four of the DPDT armature switch sets;

the switching unit includes a second DPDT relay carrying the remaining two sets of DPDT armature switches; and the primary power source is coupled with coils of both the first and the second relays and is configured to energize the coils when AC power is available from the primary power source.

10. An elevator interior illumination assembly as defined in claim 1 in which the assembly includes a second backup LED alternately couplable to the primary LED driver and the backup electric power source.

11. An elevator interior illumination assembly as defined in claim 10 in which the switching unit is configured to:

electrically couple the second backup LED with the primary LED driver in series with the first backup LED when AC power is available to the primary LED driver from the primary electric power source; and electrically couple the second backup LED with the backup electric power source in parallel with the first backup LED when AC power is not available to the primary LED driver from the primary electric power source.

12. An elevator interior illumination assembly as defined in claim 11 in which:

the switching unit includes first, second, third, and fourth DPDT relay armature switch sets;

the primary LED driver provides voltage across respective normally closed (NC) pins of the first and second DPDT relay armature switch sets;

the second backup LED is connected between a common (COM) pin of the second DPDT relay armature switch set and a COM pin of the third DPDT relay armature switch set;

the first backup LED is connected between a common (COM) pin of the first DPDT relay armature switch set and a COM pin of the fourth DPDT armature switch set;

the backup electric power source is coupled to and provides DC voltage across respective NO pins of third and fourth DPDT relay armature switch sets;

first and second jumpers couple the NO pins of the first and second switch sets to the respective COM pins of the third and fourth switch sets;

a third jumper couples NC pins of the third and fourth DPDT relay armature switch sets;

when AC power is available the primary power source provides power to the primary LED driver and energizes a relay coil adjacent the first and second DPDT relay armature switch sets, which connects the first and second backup LEDs in series with the primary LED driver;

when AC power is not available and the relay coil is not energized, the first and second backup LEDs are connected in respective parallel circuits to the backup electric power source.

13. An elevator interior illumination assembly as defined in claim 12 in which:

the backup electric power supply comprises a battery; and the assembly includes a battery charger coupled between the primary electric power source and the battery and configured to receive AC power from the primary electric power source and provide DC charging voltage across terminals of the battery when AC power is available from the primary power source.

14. An elevator interior illumination assembly as defined in claim 12 in which the switching unit includes a first DPDT relay carrying the four DPDT armature switch sets.

\* \* \* \* \*